United States Patent
Oe et al.

(10) Patent No.: US 6,629,892 B2
(45) Date of Patent: Oct. 7, 2003

(54) GAME SYSTEM, GAME DEVICE, GAME DEVICE CONTROL METHOD AND INFORMATION STORAGE MEDIUM

(75) Inventors: Osamu Oe, Sapporo (JP); Kazuyoshi Takehara, Sapporo (JP); Akihide Tanimura, Sapporo (JP); Yasukazu Majima, Sapporo (JP)

(73) Assignee: Konami Corporation, Tokyo (JP)

( * ) Notice: Subject to any disclaimer, the term of this patent is extended or adjusted under 35 U.S.C. 154(b) by 96 days.

(21) Appl. No.: 09/833,668

(22) Filed: Apr. 13, 2001

(65) Prior Publication Data

US 2002/0022520 A1 Feb. 21, 2002

(30) Foreign Application Priority Data

Apr. 14, 2000 (JP) ........................................ 2000-113675

(51) Int. Cl.[7] .................................................. A63F 13/12
(52) U.S. Cl. ........................................................ 463/40
(58) Field of Search ................................ 463/40, 41, 42

(56) References Cited

U.S. PATENT DOCUMENTS 6,132,315 A 10/2000 Miyamoto et al.
6,375,572 B1 * 4/2002 Masuyama et al. ........... 463/43

FOREIGN PATENT DOCUMENTS

JP 2000-37558 2/2000
TW 374735 11/1999

OTHER PUBLICATIONS

Metamode: Official Guide Book, Published by KOEI Co., Ltd. Feb. 29, 2000, "Double the Excitement by Communication Play"; p. 7, p. 17 and p. 50, p. 110.
Shukan Famitsu, ASCHII Corporation, Mar. 10, 2000, vol. 15, No. 10, p. 44, Lower Left Column.

* cited by examiner

Primary Examiner—Andrew M. Dolinar
(74) Attorney, Agent, or Firm—Sughrue Mion, PLLC

(57) ABSTRACT

To provide a game system allowing two players to enjoy a game together toward a common goal. In a cooperation requiring event area, a giant rock blocks a path to be followed by a player character. The giant rock cannot be moved by the player character alone. Then, the game device of the player character is made connected for communication to other game device so that another player character is fetched from the connected game device. When the two player characters cooperate at their respective game devices, the giant rock is able to be moved by the two player characters.

15 Claims, 4 Drawing Sheets

GAME SYSTEM, GAME DEVICE, GAME DEVICE CONTROL METHOD AND INFORMATION STORAGE MEDIUM

BACKGROUND OF THE INVENTION

1. Field of the Invention

The present invention relates to a game system, a game device, a game device control method, and an information storage medium. In particular, the present invention relates to a technique clearing a game event through collaboration between players of two game devices connected to each other for communication.

2. Description of the Related Art

According to some game software for portable game devices and so on, two game devices are connected for communication to each other via a cable and so on so that players of the devices can enjoy a match game. With such game software, two people can enjoy a game together. This makes the game devices more attractive.

In match games, generally, two players fight against each other. However, should two players be able to enjoy games together toward the same goal, communication would be encouraged between them. This makes such communication game devices more attractive in a way different from a conventional manner.

SUMMARY OF THE INVENTION

The present invention has been conceived in the above situation, and aims to provide a game system, a game device, a game device control method, and an information storage medium, allowing two players to enjoy a game toward the same goal.

In order to achieve the above object, according to one aspect of the present invention, there is provided a game system having a first game device and a second game device, the both devices being capable of communicating to each other. In this game system, the second game device has operation signal transmission means for transmitting an operation signal from the second game device to the first game device, and the first game device comprises game screen image displaying means for displaying a game screen image representing a predetermined cooperation requiring game event; own device operation signal receiving means for receiving an operation signal from the first game device; other device operation signal receiving means for receiving an operation signal from the second game device; and event clearing means for clearing the cooperation requiring game event when the operation signal received from the first game device and the operation signal received from the second game device correspond to a predetermined collaboration operation.

According to another aspect of the present invention, there is provided, a game device, comprising game screen image displaying means for displaying a game screen image representing a predetermined cooperation requiring game event; own device operation signal receiving means for receiving an operation signal from its own game device; other device operation signal receiving means for receiving an operation signal from other game device connected to the own game device; and event clearing means for clearing the cooperation requiring game event when the operation signal received from the own game device and the operation signal received from the other game device correspond to a predetermined collaboration operation.

According to a still another aspect of the present invention, there is provided a game device control method, comprising a game screen image displaying step of displaying a game screen image representing a predetermined cooperation requiring game event; an own device operation signal receiving step of receiving an operation signal from its own game device; an other device operation signal receiving step of receiving an operation signal from other game device connected to the own game device; and an event clearing step of clearing the cooperation requiring game event when the operation signal received from the own game device and the operation signal received from the other game device correspond to a predetermined collaboration operation.

A yet another aspect of the present invention, there is provided an information storing medium storing a program for having a computer to execute a game screen image displaying step of displaying a game screen image representing a predetermined cooperation requiring game event; an own device operation signal receiving step of receiving an operation signal from its own game device; an other device operation signal receiving step of receiving an operation signal from other game device connected to the own game device; and an event clearing step of clearing the cooperation requiring game event when the operation signal received from the own game device and the operation signal received from the other game device correspond to a predetermined collaboration operation.

According to the present invention, two game devices communicate to each other so that an operation signal is transmitted from one to the other. Upon receipt of an operation signal, the game device clears a cooperation requiring game event when its own operation signal and the received operation signal correspond to a predetermined collaboration operation. With this arrangement, two players can enjoy a game together toward a common goal, which can make the game devices more attractive. Here, a predetermined collaboration operation is an operation attempted cooperatively by two players to clear a cooperation requiring game event. A collaboration operation may include declaration of cooperative willing, operation toward each player character to clear a cooperation requiring game event, and so on.

BRIEF DESCRIPTION OF THE DRAWINGS

The above and the other objects, features, and advantages of the present invention, will become further apparent from the following description of the preferred embodiment taken in conjunction with the accompanying drawings wherein.

DESCRIPTION OF THE PREFERRED EMBODIMENTS

The entire disclosure of the corresponding Japanese application 2000-113657 filed on Apr. 14, 2000 including specification, claims, drawings and summary are incorporated herein by reference. In the following, preferred embodiments of the present invention will be described in detail with reference to the accompanying drawings.

Figure 1:
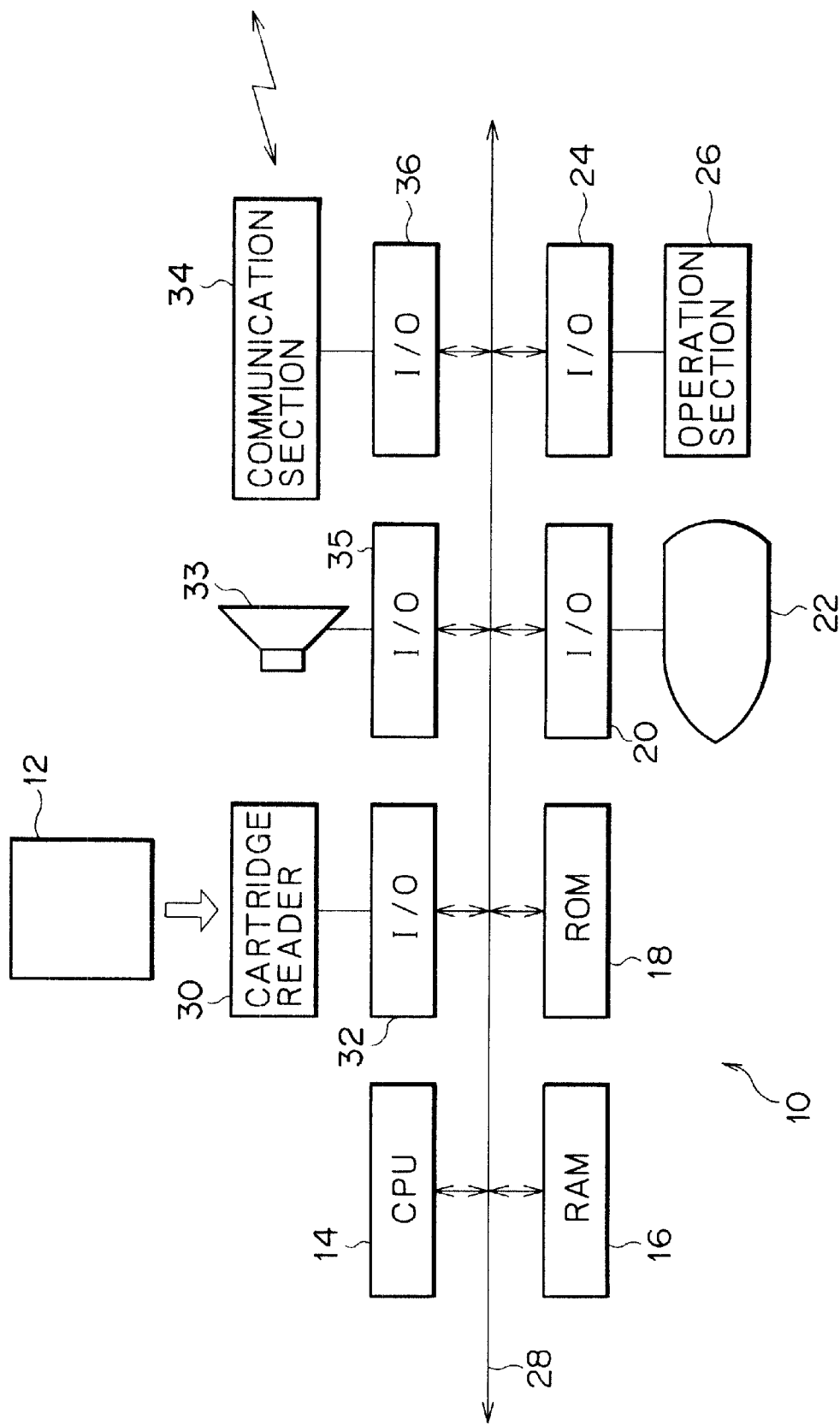
FIG. 1 is a diagram showing a structure of a game device according to a preferred embodiment of the present invention.

FIG. 1 is a diagram showing a structure of a game device according to a preferred embodiment of the present invention. A game device 10 in the drawing is of a portable type, and realized by mounting a game cartridge 12 incorporating a ROM into a cartridge reader 30 so that the game device 10 reads a game program and game data stored in the ROM. Note that, although a game cartridge 12 is used here to provide a game program and game data to the game device 10, any information storage media, such as CD-ROM, DVD, and so on, may also be usable. Alternatively, a game program may be supplied to the game device 10 remotely via a communication network.

In the game device 10, a CPU 14, a RAM 16, a ROM 18, input/output interfaces 20, 24, 32, 35, 36 are mutually connected via a bus 28 allowing data exchange. The input/output interface 32 is additionally connected to the cartridge reader 30. The input/output interface 36 is additionally connected to a communication section 34. The input/output interface 35 is additionally connected to a speaker 33. The input/output interface 20 is additionally connected to a display 22. The input/output interface 24 is additionally connected to an operation section 26. All these items, as well as a battery, are accommodated in a single body, and driven by the battery, so that they can be carried.

The CPU 14 controls the respective sections of the game device 10 based on an operation system (OS) stored in the ROM 18 and a game program read from the game cartridge 12. The bus 28 is a data path through which addresses and data are exchanged between the respective sections in the game device 10. A game program and game data read from the game cartridge 12 are written into the RAM 16 upon necessity. The RAM 16 contains a work area for the CPU 14. The display 22 may comprise, for example, an LCD, and displays a game screen image prepared by the CPU 14. The speaker 33 outputs game music, sound effects, and so on, generated by the CPU 14.

The input/output interfaces 20, 24, 32, 35, 36 are interfaces for data exchange respectively with the display 22, the operation section 26, the cartridge reader 30, the speaker 33, and the communication section 34, as well as the CPU 14. The operation section 26 is an input means via which a player operates a game. The operation section 26 has a direction key, button A, button B, a start button, and so on. The cartridge reader 30 has a space for accommodating the game cartridge 12, and a signal input/output terminal formed at the deep end of the space. When the game cartridge 12 is inserted deep in the space, signals can be exchanged between the game cartridge 12 and the cartridge reader 30. The communication section 34 is connected, for example, via a communication cable for data exchange with other game device.

In the following, a technology for achieving a role playing game using the game device 10 will be described. In particular, the role playing game includes a cooperation requiring game event. In a cooperation requiring game event, two game devices 10 are connected to each other, and the two players must cooperate at their respective game devices 10 in order to clear a cooperation requiring game event. In the following, two game devices 10 are referred to as a game device 10a and a game device 10b, respectively.

Figure 2:
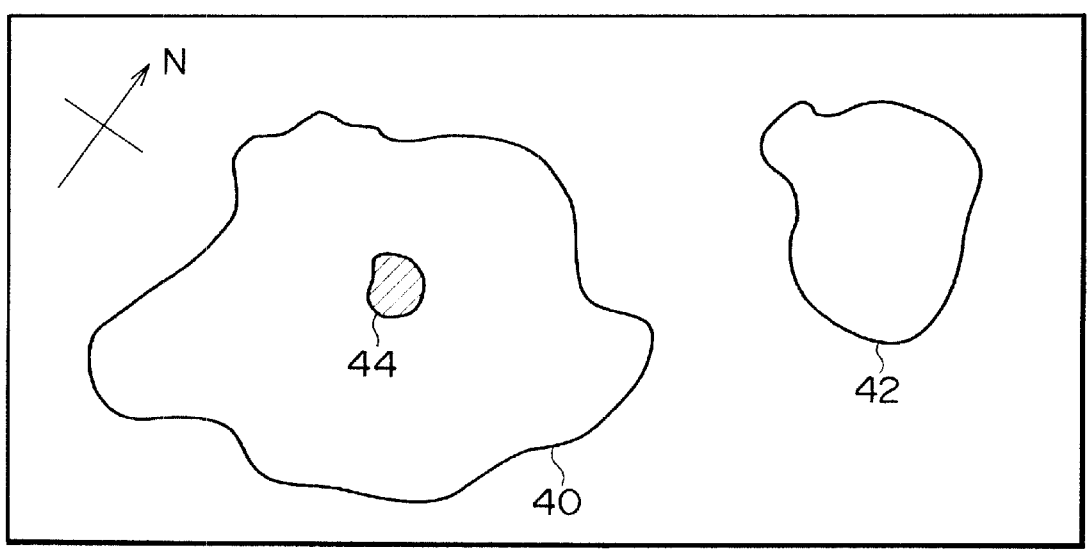
FIG. 2 is a diagram showing an exemplary game map.

FIG. 2 shows a game map used in the above-mentioned role playing game. Adventure islands 40, 42 are the places for adventure by the player characters (game characters operated by players). The ultimate goal of the game is to clear various game events held in the adventure islands 40, 42, and to escape from the islands 40, 42. In the islands 40, 42, a cooperation requiring game event takes place as a game event, for example, in a cooperation requiring event area 44. In order to clear a cooperation requiring game event, two game devices 10a, 10b are connected to each other for communication, and the two players of the respective game devices 10a, 10b must cooperate to each other. In the following, a giant rock game event will be described as a cooperation requiring game event. In this game, two players cooperatively move such a huge rock that cannot be moved by a single player character alone. Other cooperation requiring game events may include operation of a switch requiring two player characters' weights for movement, piggybacking of one player character by another player character to mount to a higher place, capturing of an animal by one player character driving the animal into a path while the other player character blocks the path, and so on.

Figure 3A:
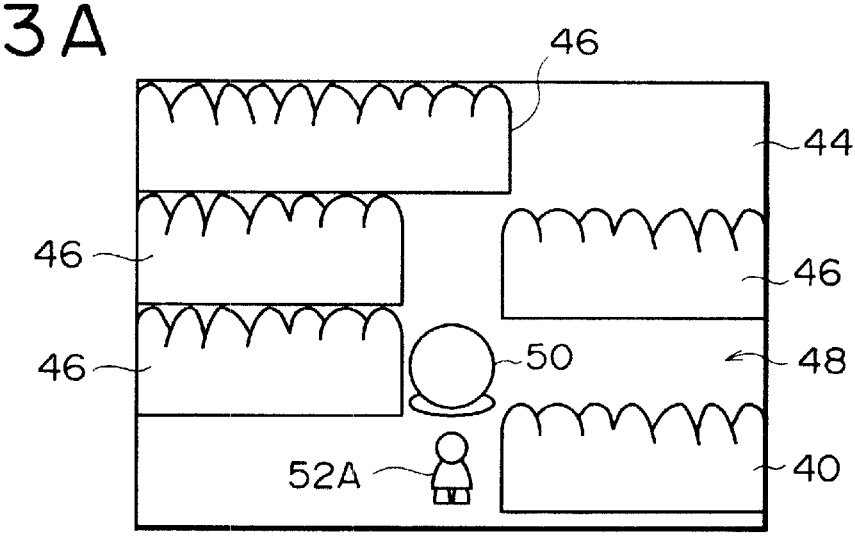
FIGS. 3A to 3C are diagrams showing exemplary game screen images displayed in a cooperation requiring game event.
Figure 3B:
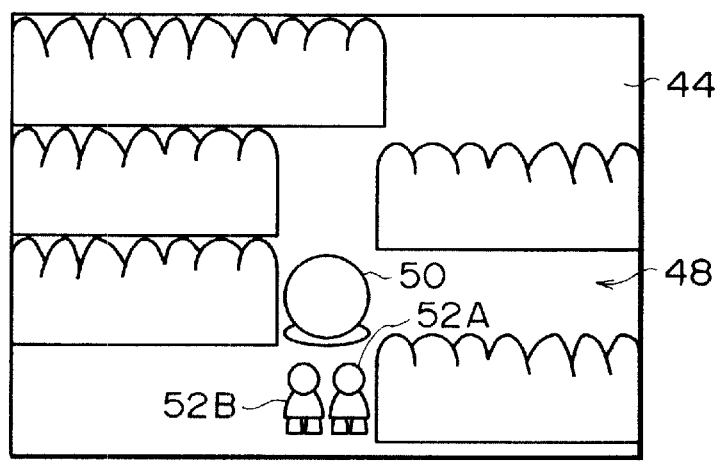
Figure 3C:
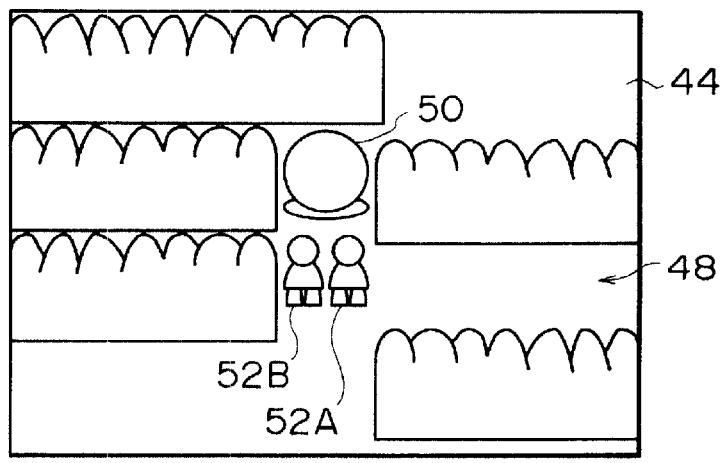

FIGS. 3A to 3C show exemplary game screen images displayed on a display during a cooperation requiring game event (a giant rock game event). FIG. 3A shows a screen image representing a state before clearing the event; FIG. 3B shows a screen image representing a state where two player characters get together to clear the event; FIG. 3C shows a screen image representing a state immediately after clearing the event. The screen image of FIG. 3A is displayed only on the game device 10a, while those of FIGS. 3B and 3C are displayed both on the game devices 10a, 10b. In the drawings, a player character 52A is corresponding to the game device 10a and operated via the operation section 26 provided to the game device 10a. Meanwhile, a player character 52B is corresponding to the game device 10b, and operated via the operation section 26 provided to the game device 10b. In the game fields shown in these drawings, the forest 46 defines a path for the player character 52A, 52B to follow. At the beginning of the giant rock game event, the path for the player 52A to follow is blocked by a giant rock 50, as shown in FIG. 3A. The rock must be moved forward (upward in the screen) in order for the player character 52A to advance the path 48. However, the giant rock 50 is too big for the player character 52A alone to move. Therefore, the game device 10a is then made connected to the game device 10b for communication to fetch the player character 52B (see FIG. 3B). When the players of the game devices 10a and 10b operate upward the direction keys provided to the respective operation sections 26, the player characters 52A, 52B can cooperatively move the giant rock 50 upward (see FIG. 3C). After the rock 50 was moved, the player character 52B disappears from the screen, and the player character 52A can advance the path 48.

Figure 4:
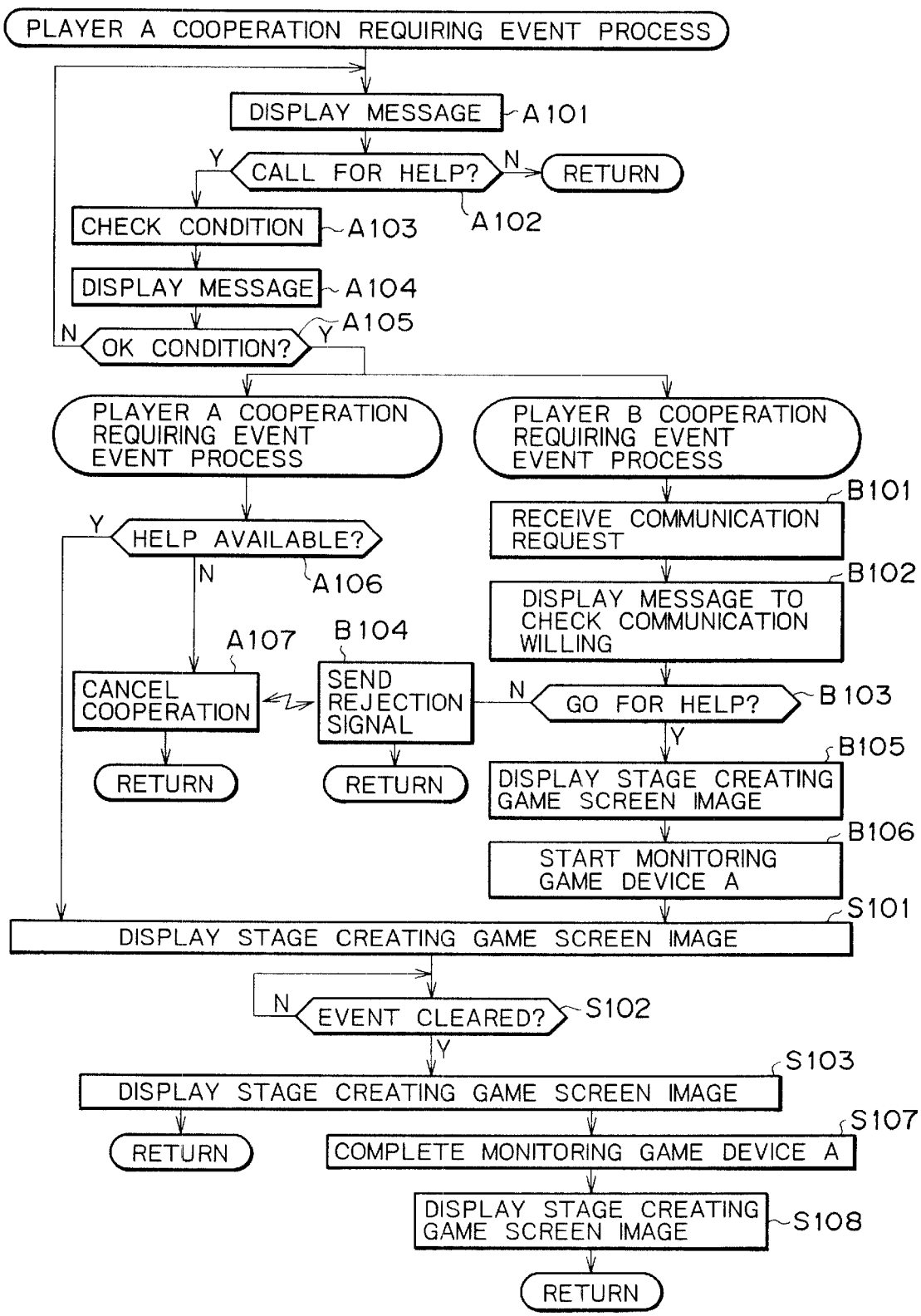
FIG. 4 is a flowchart explaining game processing according to a cooperation requiring game event.

FIG. 4 is a flowchart explaining game processing executed in the game devices 10a and 10b, particularly associated with the cooperation requiring event area 44 (a cooperation requiring event process). This processing is executed according to a game program stored in the game cartridge 12. In the following, assume a case where the game device 10a (player A) asks for a help, and the game device 10b (player B) helps.

In the game device 10a operated by the player A, the player character 52A stands in front of a giant rock 50 (see FIG. 3(a)). When the player A operates upward the operation section 26, a message, such as "I cannot move it alone! Do you want to call for a help through communication ?", is shown in the display 22 (Step A101). The message is shown in order to check whether or not the player A wishes to ask for a help through a communication play (Step A102). When the player A responds to it by expressing his willing to ask for no help, the cooperation requiring event processing is completed, returning to normal game processing. On the other hand, when the player A responds by expressing his willing to ask for a help, the game device 10a checks a communication condition (Step A103). Specifically, the game device 10a accesses the input/output interface 36 to see whether or not its communication section 34 is connected via a cable to the communication section 34 of the game device 10b. The game device 10 additionally checks whether or not the game device 10b is mounted with a game cartridge 12 storing an identical game program, and whether or not the current state of the game played by the player B allows the player B to accept the cooperation request. For this checking, for example, the game device 10a may send a cooperation requesting signal to the game device 10b, and the game device 10b, in response to the signal, returns a signal telling that it cannot accept the request should it be in the middle of demonstration or a window operation and so on. During the check on the communication condition, a message, such as "Please wait", may be shown in the display 22 (Step A104). When a communication play is not applicable (Step A105), another message, such as "I cannot move it alone!", is shown on the display 22 (Step A101). On the other hand, when a communication play is applicable, the game device 10b initiates cooperation requiring game event processing (Step B101 and thereafter).

Meanwhile, at the predetermined timings, the game device 10b accesses the communication section 34 to see whether or not it has received a cooperation requesting signal from the game device 10a even while the player character 52B is in the outside of the cooperation requiring event area 44. When such a request should be arrived from the game device 10a (Step B101), a message, such as ". . . ? I feel someone is calling me! Will you go for help through communication ?", may be displayed to check the willing of the player B (Step B102). Such a message is generally shown in a window temporarily appearing in the lower part of the screen. When the player B responds to the message by expressing his intention of not coming using the operation section 26 (Step B103), the game device 10b sends a rejection signal to the game device 10a (Step B104) before returning to the original game processing. On the other hand, when the player B responds by expressing his intention of coming (step B103), the game device 10b sends an acknowledge signal to the game device 10a, and displays a stage creating game screen image on the display 22 (Step B105). Specifically, the player character 52B of the game device 10b disappears from the screen, leaving a message shown on the display, such as "Ruffle, ruffle . . . ", so as to create a transfiguration scene where the game character 52B is being transfigured into a helping-man character. The game device 10b thereafter monitors the game device 10a via the communication section 34 so that the game screen image shown in the display 22 of the game display 10a is also shown in the game display 10b (Step B106). After receipt of the acknowledge signal, the game device 10a starts monitoring via the communication section 34 an operation signal input via the operation section 26 of the game device 10b.

In the game device 10a, upon a decision at step A105 such that communication play is applicable, whether or not a help is available from the game device 10b is determined (Step A106) Specifically, the game device 10a monitors whether a rejection signal or an acknowledge signal arrives from the game device lob. With a rejection signal arrived (see Step B104), a message, such as "Not coming . . . ", may be shown in the display 22, and the cooperation requiring event processing is completed (Step A107), returning to the normal game processing. With an acknowledge signal arrived, on the contrary, the game device 10a shows a stage creating game screen image on the display 22 (Step S101), where, for example, the player character 52B, now in the form of a helping-man character, may show up and walks toward the player character 52A (see FIG. 3B). This stage creating game screen image is shown also on the display 22 of the game device 10b. The game device 10a thereafter monitors an operation signal input via the operation section 26 of the game device 10b as well as an operation signal input via the operation section 26 of its own device so that whether or not the direction keys are simultaneously operated upward (a collaboration operation) is determined (Step S102). When a decision is made based on the operation signals that the players A and B conducted simultaneous upward operations, an image is displayed where the player characters 52A and 52B are moving the giant rock 50 (see FIG. 3C), upon which the cooperation requiring game event is cleared. Then, a message, such as "Thank you!", may be shown in the game devices 10a and 10b, and the player character 52B is shown disappearing from the screens (Step S103). An image of the player character disappearing from the screens creates an atmosphere that the cooperation requiring game event was cleared. The image is shown both on the displays 22 of the game devices 10a and 10b. Normal game processing is then resumed in the game device 10a. As described above, the player character 52A can clear the cooperation requiring game event with the aid of the player character 52B, and can therefore advance the path 48.

Once the cooperation requiring game event is cleared, the game device 10b stops monitoring the game device 10a (Step B107), and displays a screen image where the player character 52B, who has gone in a helping-man outfit, has now returned to the original game screen image in the original outfit (Step B108) before resuming the original game processing.

According to the game devices 10a, 10b described above, in order to clear the giant rock game event, the game devices 10a, 10b must be connected to each other for communication, and the players A and B must cooperate using their operation sections 26. This allows the two players to enjoy the game together toward a common goal, and communication may therefore be encouraged between them. As a result, the game devices 10 adapted to a communication play become more attractive in a way different from a conventional game device.

It should be noted that the present invention is not limited to the above described preferred embodiment.

For example, whereas a cooperation requiring game is cleared upon collaboration operation by the players A and B conducting simultaneous upward operation using their operating sections 26 in the above, the game may instead be cleared by the player B accepting a cooperation request by thus operating. In this case, animation toward clearing the game is subsequently displayed either automatically or in response to an operation by the player A. In this case, the player A's requesting help and the player B's accepting the request together constitute a collaboration operation.

Here, whereas a game program and game data are stored in a game cartridge 12 and reproduced using a portable game device 10 in the above, various other types of information storage medium, such as CD-ROM, DVD, and so on, may be used instead. Moreover, any computers, such as a personal computer, which can read a game program and game data stored in an information storage medium and apply information processing based on the content read, may be usable. Alternatively, a computer which can receive a game program and game data via a communication network, such as a portable telephone and a PDA (portable digital assistance), and apply information processing based on the information received, may be usable.

What is claimed is:

1. A game system having a first game device and a second game device, the both devices being capable of communicating to each other, wherein the second game device comprises operation signal transmission means for transmitting an operation signal from the second game device to the first game device, and the first game device comprises game screen image displaying means for displaying a game screen image representing a predetermined cooperation requiring game event;

own device operation signal receiving means for receiving an operation signal from the first game device;

other device operation signal receiving means for receiving an operation signal from the second game device; and event clearing means for clearing the cooperation requiring game event when the operation signal received from the first game device and the operation signal received from the second game device correspond to a predetermined collaboration operation, wherein said first game device further comprises:

means for requesting assistance from said second game device upon encountering a cooperation requiring event during execution of the game, and means for receiving an acceptance of assistance from said second game device.

2. The game system, as set forth in claim 1, wherein said means for requesting further comprises means for checking whether the second game device is connected to the first game device and whether the second game device is executing a desired game program.

3. A game system having a first game device and a second game device, the both devices being capable of communicating to each other, wherein the second game device comprises operation signal transmission means for transmitting an operation signal from the second game device to the first game device, and the first game device comprises game screen image displaying means for displaying a game screen image representing a predetermined cooperation requiring game event;

own device operation signal receiving means for receiving an operation signal from the first game device;

other device operation signal receiving means for receiving an operation signal from the second game device; and event clearing means for clearing the cooperation requiring game event when the operation signal received from the first game device and the operation signal received from the second game device correspond to a predetermined collaboration operation, wherein said second game device further comprises:

means for monitoring for requests from said first game device for assistance in executing a cooperation requesting event; and means for selectively advising said first game device that assistance will be provided and for forwarding cooperation signals during a cooperation requiring event.

4. A game device, comprising:

game screen image displaying means for displaying a game screen image representing a predetermined cooperation requiring game event;

own device operation signal receiving means for receiving an operation signal from its own game device; other device operation signal receiving means for receiving an operation signal from other game device connected to the own game device; and event clearing means for clearing the cooperation requiring game event when the operation signal received from the own game device and the operation signal received from the other game device correspond to a predetermined collaboration operation, further comprising:

means for requesting assistance from said other game device upon encountering a cooperation requiring event during execution of the game, and means for receiving an acceptance of assistance from said other game device.

5. The game device, as set forth in claim 4, wherein said means for requesting further comprises means for checking whether the other game device is connected to the game device and whether the other game device is executing a desired game program.

6. A game device, comprising:

game screen image displaying means for displaying a game screen image representing a predetermined cooperation requiring game event;

own device operation signal receiving means for receiving an operation signal from its own game device;

other device operation signal receiving means for receiving an operation signal from other game device connected to the own game device; and event clearing means for clearing the cooperation requiring game event when the operation signal received from the own game device and the operation signal received from the other game device correspond to a predetermined collaboration operation, further comprising:

means for monitoring for requests from an other game device for assistance in executing a cooperation requesting event; and means for selectively advising said other game device that assistance will be provided and for forwarding cooperation signals during a cooperation requiring event.

7. A game device control method, comprising:

a game screen image displaying step of displaying a game screen image representing a predetermined cooperation requiring game event;

an own device operation signal receiving step of receiving an operation signal from its own game device;

an other device operation signal receiving step of receiving an operation signal from other game device connected to the own game device; and an event clearing step of clearing the cooperation requiring game event when the operation signal received from the own game device and the operation signal received from the other game device correspond to a predetermined collaboration operation, further comprising:

requesting assistance from said other game device upon encountering a cooperation requiring event during execution of the game event, and receiving an acceptance of assistance from said other game device.

8. The game device control method, as set forth in claim 7, wherein said step of requesting further comprises checking whether the other game device is connected to the own game device and whether the other game device is executing a desired game program.

9. A game device control method, comprising:

a game screen image displaying step of displaying a game screen image representing a predetermined cooperation requiring game event;

an own device operation signal receiving step of receiving an operation signal from its own game device;

an other device operation signal receiving step of receiving an operation signal from other game device connected to the own game device; and an event clearing step of clearing the cooperation requiring game event when the operation signal received from the own game device and the operation signal received from the other game device correspond to a predetermined collaboration operation, further comprising:

monitoring requests from an other game device for assistance in executing a cooperation requesting event; and selectively advising said other game device that assistance will be provided and forwarding cooperation signals during a cooperation requiring event.

10. An information storing medium storing a program for having a computer to execute:

a game screen image displaying step of displaying a game screen image representing a predetermined cooperation requiring game event;

an own device operation signal receiving step of receiving an operation signal from its own game device;

an other device operation signal receiving step of receiving an operation signal from other game device connected to the own game device; and an event clearing step of clearing the cooperation requiring game event when the operation signal received from the own game device and the operation signal received from the other game device correspond to a predetermined collaboration operation, wherein said program has said computer further execute:

requesting assistance from said other game device upon encountering a cooperation requiring event during execution of the game, and receiving an acceptance of assistance from said other game device.

11. The information storage medium, as set forth in claim 10, wherein said program has said computer executed step of requesting further comprises checking whether the other game device is connected to the game device and whether the other game device is executing a desired game program.

12. An information storing medium storing a program for having a computer to execute:

a game screen image displaying step of displaying a game screen image representing a predetermined cooperation requiring game event;

an own device operation signal receiving step of receiving an operation signal from its own game device;

an other device operation signal receiving step of receiving an operation signal from other game device connected to the own game device; and an event clearing step of clearing the cooperation requiring game event when the operation signal received from the own game device and the operation signal received from the other game device correspond to a predetermined collaboration operation, wherein said program has said computer further execute:

monitoring for requests from an other game device for assistance in executing a cooperation requesting event; and selectively advising said other game device that assistance will be provided and forwarding cooperation signals during a cooperation requiring event.

13. A game device, comprising:

a game screen image display for displaying a game screen image representing a predetermined cooperation requiring game event;

own device operation signal obtainer for obtaining an operation signal from its own game device;

other device operation signal receiver for receiving an operation signal from other game device connected to the own game device; and event clearer for clearing the cooperation requiring game event when the operation signal obtained from the own game device and the operation signal received from the other game device correspond to a predetermined collaboration operation, further comprising:

means for requesting assistance from said other game device upon encountering a cooperation requiring event during execution of the game, and means for receiving an acceptance of assistance from said other game device.

14. The game device, as set forth in claim 13, wherein said means for requesting further comprises means for checking whether the other game device is connected to the own game device and whether the other game device is executing a desired game program.

15. A game device, comprising:

a game screen image display for displaying a game screen image representing a predetermined cooperation requiring game event;

own device operation signal obtainer for obtaining an operation signal from its own game device;

other device operation signal receiver for receiving an operation signal from other game device connected to the own game device; and event clearer for clearing the cooperation requiring game event when the operation signal obtained from the own game device and the operation signal received from the other game device correspond to a predetermined collaboration operation, further comprising:

means for monitoring for requests from an other game device for assistance in executing a cooperation requesting event; and means for selectively advising said other game device that assistance will be provided and for forwarding cooperation signals during a cooperation requiring event.

* * * * *